(12) United States Patent
Hallvardsson et al.

(10) Patent No.: US 8,616,099 B2
(45) Date of Patent: Dec. 31, 2013

(54) PORTIONING OF FOOD STUFF

(75) Inventors: Kristjan Hallvardsson, Kopavogur (IS);
Steindor Eiriksson, Reykjavik (IS);
Hordur Einarsson, Seltjarnarnes (IS)

(73) Assignee: Marel HF, Gardabaer (IS)

( * ) Notice: Subject to any disclaimer, the term of this patent is extended or adjusted under 35 U.S.C. 154(b) by 970 days.

(21) Appl. No.: 11/920,704

(22) PCT Filed: May 16, 2006

(86) PCT No.: PCT/IS2006/000011
§ 371 (c)(1),
(2), (4) Date: Oct. 14, 2009

(87) PCT Pub. No.: WO2006/123368
PCT Pub. Date: Nov. 23, 2006

(65) Prior Publication Data
US 2010/0031791 A1   Feb. 11, 2010

(30) Foreign Application Priority Data

May 19, 2005   (IS) .............................................. 7852

(51) Int. Cl.
*B26D 1/00*   (2006.01)
*B26D 7/08*   (2006.01)
(52) U.S. Cl.
USPC .......... 83/13; 83/23; 83/162; 83/165; 83/369; 83/703; 83/932
(58) Field of Classification Search
USPC ............... 83/13, 23, 207, 221, 391, 932, 368, 83/369, 370, 76.6, 165, 703, 714, 409.2, 83/162; 99/537, 589; 53/514, 517
See application file for complete search history.

(56) References Cited

U.S. PATENT DOCUMENTS 2,167,215 A * 7/1939 Leary .................................. 83/15
3,361,173 A * 1/1968 Lamb .................................. 83/23
(Continued)

FOREIGN PATENT DOCUMENTS

EP   1 445 078 A2   8/2004

OTHER PUBLICATIONS

International Preliminary Report on Patentability and Written Opinion of the International Searching Authority, mailed Nov. 19, 2007, in corresponding Application Serial No. PCT/IS2006/000011.

(Continued)

*Primary Examiner* — Omar Flores Sanchez
(74) *Attorney, Agent, or Firm* — Nixon & Vanderhye PC

(57) ABSTRACT

An apparatus for portioning meat includes a base unit, controlling means, first drive means mounted on the base unit, a casing mounted on the base unit, second drive means that cooperates with the first drive means to rotate the casing, and a pressing member dividing the casing into at least two chambers, an in-feed chamber and a pressing chamber. The pressing member is rotatably mounted between the base unit and a top plate, so as to be off-center with respect to the casing, substantially closer to the pressing chamber than the in-feed chamber, such that the pressing member has freedom to move in direction substantially perpendicular to the off-center direction. The apparatus also includes an ejecting device mounted on the base unit, a portioning plate receiving the meat ejected from the pressing chamber, a position adjustable bottom piece, and a cutting means, positioned between the pressing chamber and the portioning plate.

10 Claims, 5 Drawing Sheets

(56) References Cited

U.S. PATENT DOCUMENTS

| | | | |
|---|---|---|---|
| 5,878,643 A * | 3/1999 | Hwang | 83/781 |
| 6,272,958 B1 * | 8/2001 | Abler et al. | 83/23 |
| 6,318,225 B1 * | 11/2001 | Longoria | 83/454 |
| 6,418,823 B1 * | 7/2002 | Taitler | 83/36 |
| 7,000,518 B2 * | 2/2006 | Bucks et al. | 83/402 |
| 7,097,727 B2 * | 8/2006 | Podominick et al. | 156/250 |
| 7,430,947 B2 * | 10/2008 | Julian et al. | 83/207 |
| 7,658,135 B2 * | 2/2010 | Grasselli | 83/707 |
| 7,748,303 B2 * | 7/2010 | Julian et al. | 83/207 |
| 7,789,000 B2 * | 9/2010 | Julian et al. | 83/13 |
| 7,832,313 B2 * | 11/2010 | Hermansen et al. | 83/23 |
| 8,156,851 B2 * | 4/2012 | Julian et al. | 83/13 |
| 8,215,231 B2 * | 7/2012 | Bigge et al. | 99/509 |
| 8,220,685 B1 * | 7/2012 | Lindsey, Jr. et al. | 225/93 |

OTHER PUBLICATIONS

International Search Report for PCT/IS2006/000011 mailed Aug. 21, 2006.

* cited by examiner

PORTIONING OF FOOD STUFF

This application is the U.S. national phase of International Application No. PCT/IS2006/000011, filed 16 May 2006, which designated the U.S. and claims priority to Iceland Application No. 7852, filed 19 May 2005, the entire contents of each of which are hereby incorporated by reference.

TECHNICAL FIELD

The present invention concerns an apparatus and method for portioning of objects into accurate weight and form.

BACKGROUND ART

In many areas of the food industry, it is desirable for certain food to be prepared in portions which are as accurate and equal in weight, shape and size as possible.

Modern food industry demands high levels of productivity and precision. It is the aim of the producer and requests of the buyer to obtain as accurate portion size as possible. It is also an important factor that the objects, in this case fish or meat portions have a certain configuration and/or thickness due to the end buyers' requests. Enhanced processing technology would lead to much better utilization of raw material and thus cost-effectiveness of processing.

It would be desirable if the production and further processing of meat products such as i.e. beef, pork or turkey could be cut and prepared in portions which are almost identical. Correspondingly equally sized portions of meat could then be processed further or sold optimally.

Corresponding calibrating devices have been disclosed for shaped and processed meat, in which the meat is initially processed and then pressed together again to take on a certain shape. However, this requires the stringy meat to be processed into very small pieces or involves utilizing meat residues. A calibrated cutting installation having a shaping tube for feeding the meat to a cutting device in order to separate meat into portions which are as much as possible of equal size by means of a cutter has already been disclosed. The shaping tube can be separated into two parts in the longitudinal direction. The end of the shaping tube, at a so-called delivery hole, is adjoined by pot-shaped or shell-shaped depressions, the size and volume of which predetermine the corresponding portion. Then, a cutter can be moved through a spacer gap between the feed hole of the shaping tube and the abovementioned calibrated shaping cavity, the oblique arrangement of the cutting edges of the cutter causes a pulling cut, with the result that the corresponding amount of meat situated in the calibrated shaping cavity can be separated from the large remaining amount of meat situated in the shaping tube. Then, the pot-shaped calibrating plate can be moved in order to remove the amount of meat which is situated in the calibrating cavity from the calibrating cavity and, for example, to deliver it to a conveyor belt.

A device for cutting pieces of raw meat into dices or strips has already been disclosed. Since meat in the thawed state is too yielding and soft to be cut into dice or longitudinal strips, some of these known methods require the meat to be partially frozen beforehand. It may even be necessary for the piece of meat to be laterally compressed prior to cutting so that it can then be forced out of a pressing cavity. However, known methods of this type are generally only able to produce unevenly portioned slices, since the small pieces of meat are often not cut through cleanly.

In view of the above prior art, the object of the present invention is to provide an improved calibrated cutting device which can be used to portion any type of food that is suitable for cutting, in particular meat, with or without bones, as optimally as possible, with the minimum possible weight, shape and size discrepancies.

DISCLOSURE OF INVENTION

It is, therefore, an object of the present invention to provide an improved portioning device and an improved method for producing food products in slices, in particular for producing pieces of raw meat in slices. The present invention allows a considerable improvement compared to conventional solutions while using amazingly simple means.

In a first aspect, the present invention relates to an apparatus for portioning meat, the apparatus comprising a base unit (1), and a controlling means, a first drive means (2) mounted to the base unit (1), and a casing (3) mounted to the base unit (1). The casing (3) further comprises a second drive means (4) that cooperates with the first drive means (2) for rotating the casing (3), and a pressing member (5) for dividing the casing (3) into at least two chambers, i.e., an in-feed chamber (6) and a pressing chamber (7). The pressing member (5) is rotatably mounted between the base unit (1) and a top plate (24) by a means of a suitable hinging arrangement (26), as shown in the embodiment of the claimed meat portioning apparatus depicted in FIG. 3, so as to be positioned within casing (3) off-center with respect to the center of casing (3), and thereby substantially closer to the pressing chamber (7) than the in-feed chamber (6), such that the pressing member (5) has freedom to move within casing (3) in a direction substantially perpendicular to the direction in which the pressing member (5) is off-center with respect to the center of casing (3) and pressing member (5) rotates along with the casing (3) so as to orbit the center of casing (3) when the first drive means (2) and second (4) drive means cooperate to rotate the casing (3) 180° and the hinging arrangement (26) causes the pressing member (5) to glide within and with respect to the casing (3) as the first and second drive means rotate the casing and the pressing member rotates around the hinging arrangement (26) and orbits around the center of the casing (3), to thereby change the pressing member (5)'s relative position with respect to casing (3) so that the in-feed chamber (6) becomes a new pressing chamber (7') and the pressing chamber (7) becomes a new in-feed chamber (6'), thus producing a pressing force on meat located between the pressing member (5) and the casing (3).

An ejecting device (8) is mounted to the base unit (1) for ejecting meat from said pressing chamber (7). A portioning means (9) receives the meat ejected from the pressing chamber (7). The portioning means (9) further comprises a third drive means (10) for operating said portioning means (9), a position adjustable bottom piece (11), wherein the adjustable bottom piece (11) is automatically adjusted to optimize the yield of the meat.

A cutting means (12), is positioned between the pressing chamber and the portioning plate. The meat is placed in the in-feed chamber (6), and the in-feed chamber (6) and the pressing chamber (7) change places due to the off-center placement of the pressing member (5) when said first and second drive means rotate the casing 180°, thus the in-feed chamber (6) becomes a new-pressing chamber (7'), and the pressing chamber (7) becomes a new-in-feed chamber (6').

In a second aspect, the present invention relates to a method wherein the casing (3) rotates about its center, while the pressing member (5) rotates about its own center (25), which is off-center with respect to the center of the casing (3), by means of the hinging arrangement (26) shown in FIG. 3, causing the meat to be pressed into a shape determined by the walls of the casing (3) and the pressing member (5). As can be seen from the embodiment of the claimed meat portioning apparatus depicted FIG. 3, the hinging arrangement (26) includes pins (27) positioned at the top and bottom of the pressing member (5) and extending into grooves (28) formed in the top and bottom of the pressing member (5).

DETAILED DESCRIPTION

Figure 1:
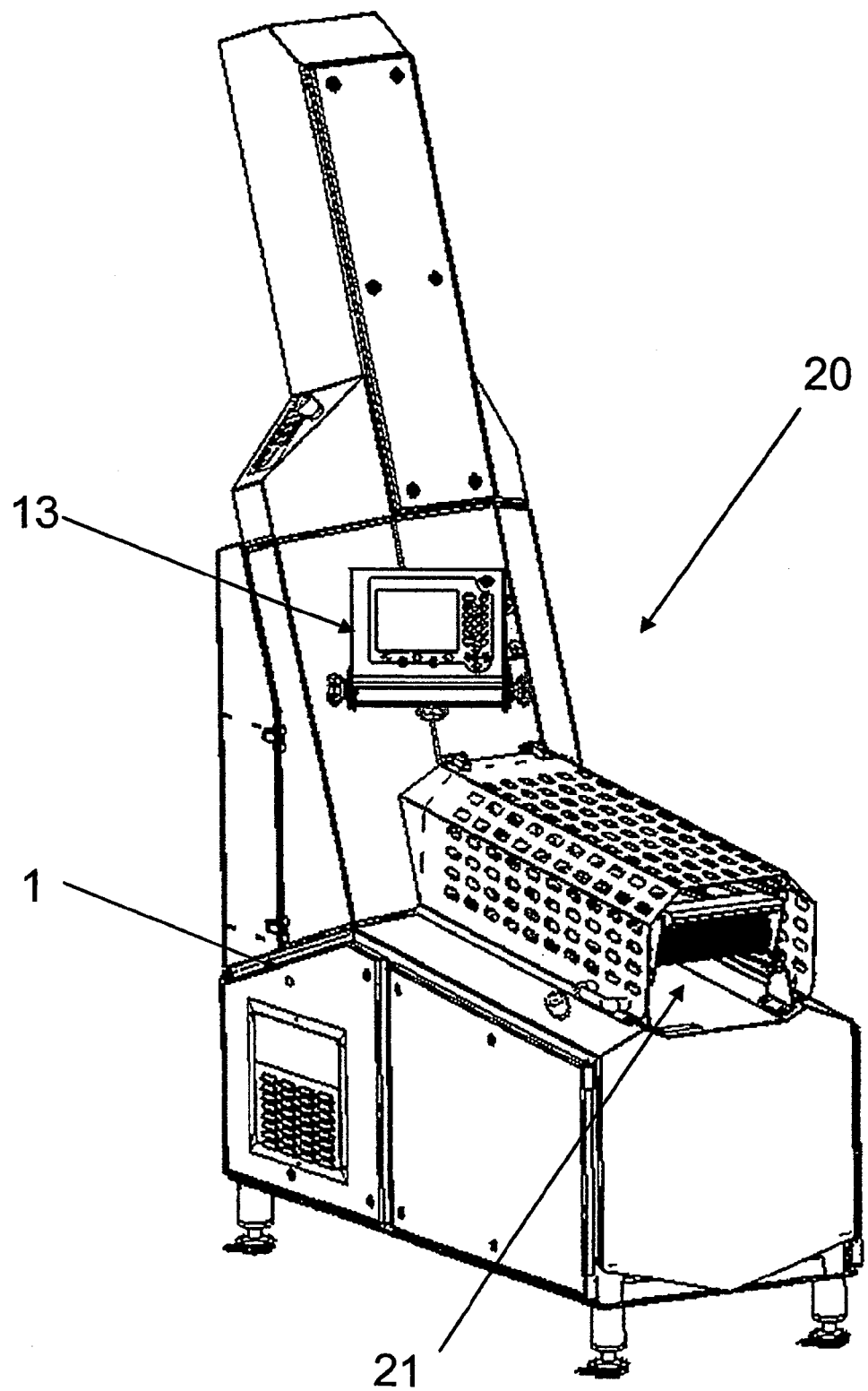
FIG. 1 shows front and side views of the meat portioning apparatus of the present invention.
Figure 2:
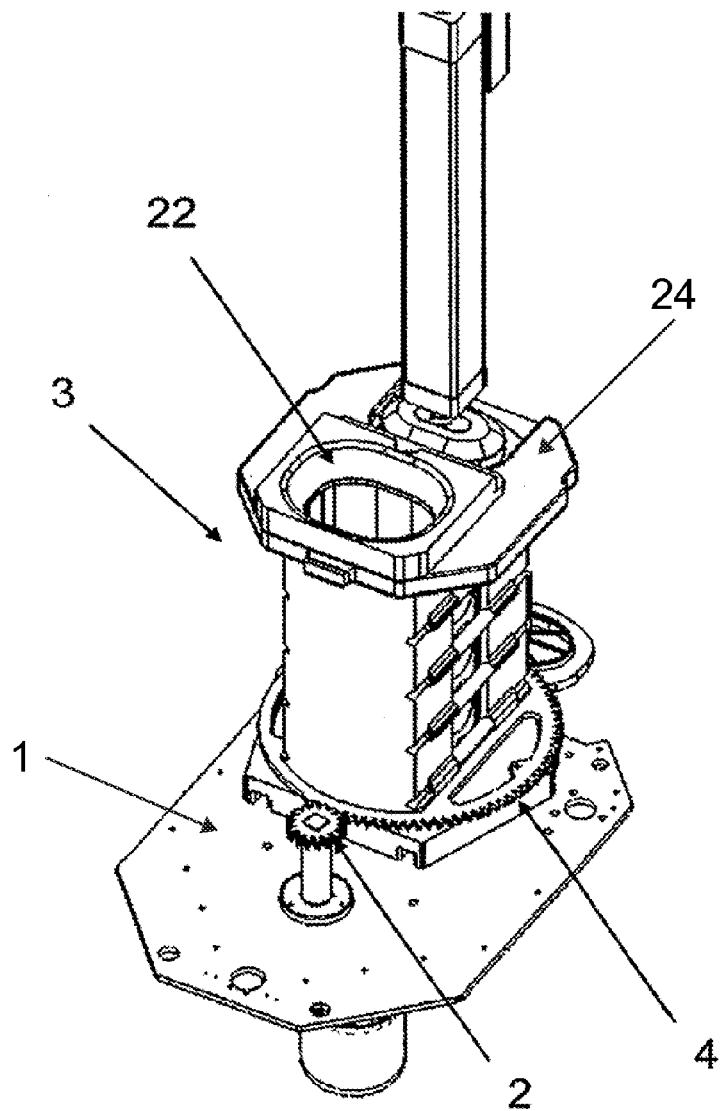
FIG. 2 shows the in-feed chamber of the casing and the first and second drive means of the meat portioning apparatus.
Figure 3:
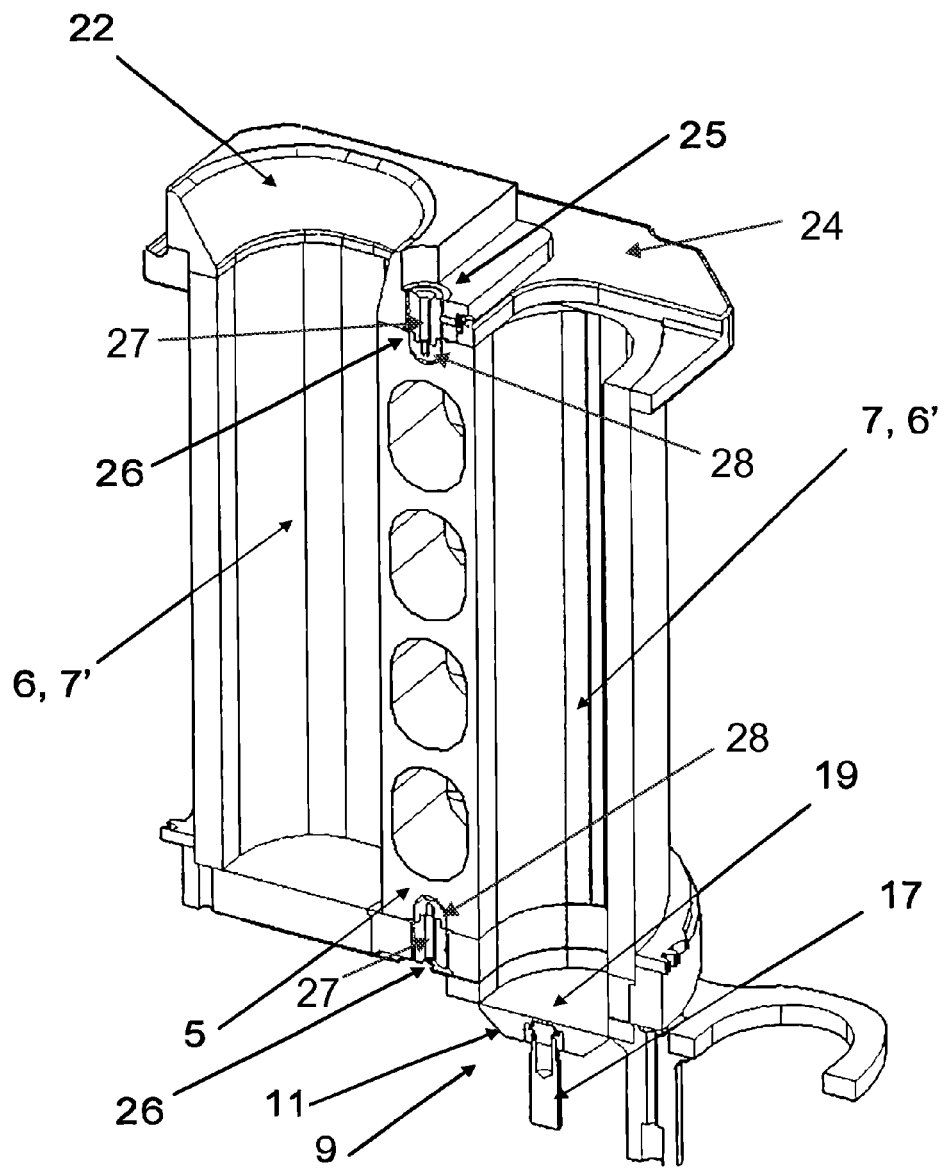
FIG. 3 is a cross sectional view of the casing, the portioning plate and the adjustable bottom piece of the meat portioning apparatus.
Figure 4:
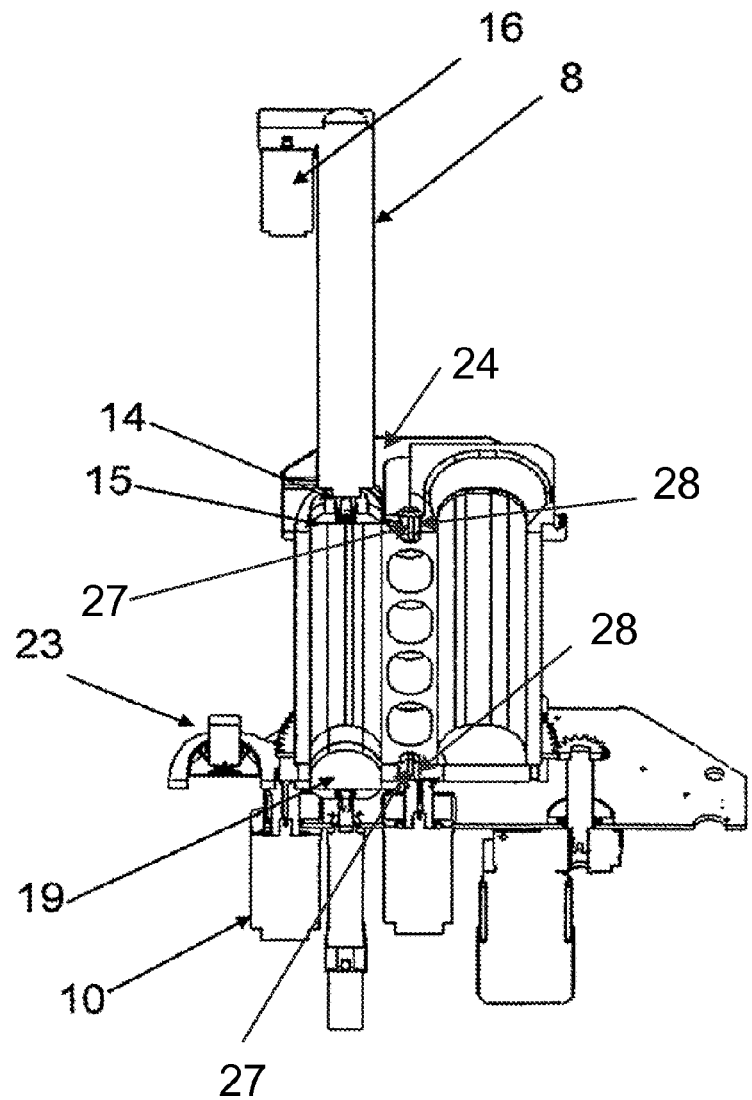
FIG. 4 is a cross sectional view of the meat portioning apparatus.
Figure 5:
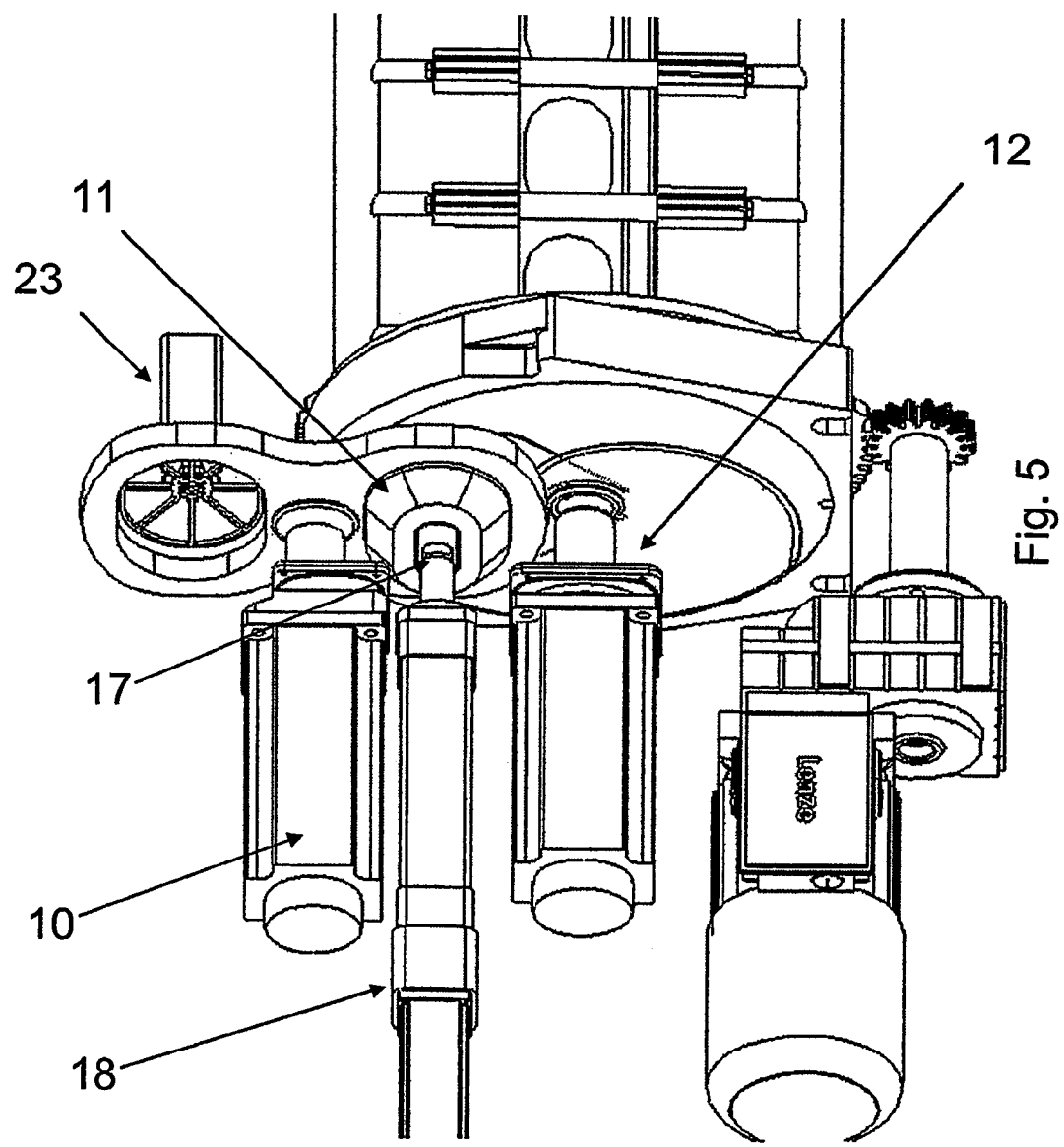
FIG. 5 shows the cutting means, the third drive means and the adjustable bottom piece of the portioning plate of the meat portioning apparatus.

In the following, the invention will be described in further details with reference to FIGS. 1 through 5. The food portioning apparatus (20) of FIG. 1 is equipped with a computer (13) for interacting with the operator, and controlling the portioning process. The meat is loaded into the portioning apparatus through a top plate (24) and the opening (22, FIG. 2) of the in-feed chamber (6, FIG. 3). When the casing (3) is rotated 180° the meat is compressed between the casing (3) and the pressing member (5) due to an off-center location of the pressing member with respect to the casing. Therefore, after rotating the casing 180° the former in-feed chamber (6) becomes the present pressing chamber (7). The compressed meat takes on the shape determined by the walls of the pressing chamber and the pressing member. This shape is substantially similar to the shape of the portioning means (9). The portioning means (9) is equipped with two symmetrical portioning plates arranged 180° apart and rotatable about its center. The meat, compressed in the pressing chamber (7), is ejected into the portioning means (9) by the ejecting device (8). The thickness of the portion is adjusted by the means of a position adjustable bottom piece (11). The meat extending from the pressing chamber (7) and filling the portioning plate (19) is sliced by the means of a rotating knife cutting the meat by passing through a slot formed between the portioning means (9) and the pressing chamber (7). When the portion has been cut from the meat in the pressing chamber (7) the portioning means (9) is rotated 180° bringing an empty portioning plate under the pressing chamber to receive the next portion ejected from the pressing chamber (7), and bringing the newly cut portion out from underneath the pressing chamber (9). The newly cut portion is then ejected out of the portioning plate (19) by the means of an ejecting device (23) onto a conveyor (21), which transfers the slices from the portioning apparatus (20).

To optimize yield, the portioning apparatus (20) is controlled by controlling means which comprise a control computer (13), a computer program, an input scale, an output scale, position generating means to indicate the position of the ejecting device (8), and a position generating means to indicate the position of the bottom of the portioning plate (19). The computer receives input information from the input scale, the output scale, the position generating means of the ejecting device, and the position generating means of the portioning plate, and generates output signals to control the adjustable bottom (11) of the portioning plate and the position of the ejecting device (8).

The ejecting device (8) comprises a rod (14), an end piece (15), and a stepper motor (16). The end piece (15) is fastened to one end of the rod (14) and the stepper motor (16) is coupled to the other end of the rod (14). Similarly, the adjustable bottom means (9) of the portioning plate (19) comprises a rod (17), an end piece (11), and a second stepper motor (18). The end piece (11) is fastened to one end of the rod (17) and the second stepper motor (18) is fastened to the other end of the rod (17). The meat, compressed in the pressing chamber (7), is ejected into the portioning means (9) by the rod (14) and the end piece (15) of the ejecting device (8) extending through the top plate (24) and into the pressing chamber (7).

The invention claimed is:

1. An apparatus for portioning meat comprising:
a base unit,
a top plate,
a controlling means,
a first drive means mounted on the base unit,
a casing mounted on the base unit, the casing having a center and further comprising:
  a second drive means that cooperates with the first drive means for rotating the casing, and
  a pressing member dividing the casing into at least two chambers, the at least two chambers being an in-feed chamber and a pressing chamber,
  the pressing member being rotatably mounted between the base unit and the top plate by a hinging arrangement, so as to be positioned within the casing off-center with respect to the center of the casing, and thereby closer to the pressing chamber than the in-feed chamber, such that (i) the pressing member is rotated along with the casing by the casing's walls so as to orbit the center of the casing when the first and second drive means cooperate to rotate the casing 180°, and (ii) the hinging arrangement causes the pressing member to glide within and with respect to the casing as the first and second drive means rotate the casing and the pressing member rotates around the hinging arrangement and orbits around the center of the casing, to thereby change the pressing member's relative position within the casing so that the in-feed chamber becomes a new pressing chamber and the pressing chamber becomes a new in-feed chamber, thus producing a pressing force between the pressing member and the new pressing chamber in the casing,
an ejecting device, mounted on the base unit, for ejecting through an opening in the top plate meat from the pressing chamber,
a portioning means for receiving the meat ejected from the pressing chamber, the portioning means further comprising:
  a portioning plate,
  third drive means for operating the portioning plate,
  a position adjustable bottom piece, wherein the adjustable bottom piece is automatically adjusted to optimize the yield of the meat,
a cutting means, positioned between the pressing chamber and the portioning plate, wherein the meat is placed in the in-feed chamber, the in-feed chamber becoming the new pressing chamber and the pressing chamber becoming the new in-feed chamber, when the first and second drive means rotate the casing 180°, due to the off-center rotatable mounting of the pressing member within the casing.

2. The apparatus according to claim 1, wherein:
the casing is rotatable about its center, while
the pressing member rotates about its own center inside the casing,
wherein during said rotation the pressing member glides within said casing changing its position within the casing from the one position within the casing to the other position within casing, thereby creating the pressing force which causes meat placed into the in-feed chamber to be pressed into a shape determined by the walls of the new pressing chamber of the casing and the pressing member.

3. The apparatus according to claim 1, wherein the controlling means comprises a computer which generates output signals to control the adjustable bottom piece of the portioning means and the position of the ejecting device.

4. The apparatus according to claim 1, wherein the ejecting device comprises:
a rod,
an end piece, and
first longitudinal drive means,
wherein the end piece is fasten to one end of the rod and the first longitudinal drive means is fastened to the other end of the rod.

5. The apparatus according to claim 3, wherein at least one of the output signals is/are used to control the first longitudinal drive means for the ejecting device.

6. The apparatus according to claim 1, wherein the adjustable bottom piece comprises:
a rod,
an end piece, and
second longitudinal drive means, and
wherein the end piece is fastened to one end of the rod and the second longitudinal drive means is fastened to the other end of the rod.

7. The apparatus according to claim 1, wherein at least one of the output signals is/are used to control the second longitudinal drive means for the adjustable bottom piece.

8. A method of using the meat portioning apparatus according to claim 1, the method comprising the steps of:
loading the meat into the in-feed chamber of the casing through an opening in the in-feed chamber,
rotating the casing 180° so that the pressing member glides within the casing from one position within casing to another position within casing so that the in-feed chamber becomes the new pressing chamber, whereby the meat is compressed between the new pressing chamber of the casing and the pressing member, the compressed meat taking on the shape determined by the walls of the new pressing chamber and the pressing member,
ejecting the meat compressed in the new pressing chamber into the portioning means using the ejecting device, the thickness of the ejected portion being adjusted by means of the position adjustable bottom piece,
slicing meat extending from the new pressing chamber and filling the portioning plate of the portioning means,
when a portion has been cut from the meat extending from the pressing chamber, rotating the portioning means 180°, to thereby bringing an empty portioning plate under the pressing chamber to receive a next cut portion of the meat extending from the new pressing chamber,
bringing the newly cut portion out from underneath the pressing chamber, and
ejecting the newly cut portion out of the portioning plate by the means of an ejecting device onto a conveyor, which transfers cut slices from the portioning apparatus,
the controlling means being comprised of a control computer for use in controlling the operation of the portioning apparatus.

9. The method of using an apparatus according to claim 8, wherein the casing rotates about its center, and the pressing member rotates along with the casing when the first drive means and second drive means cooperate to rotate the casing 180°, causing the pressing member to glide within the casing from the one position within casing to the other position within the casing, thereby causing the meat to be pressed into the shape determined by the walls of the new pressing chamber and the pressing member.

10. The method of using an apparatus according to claim 8, wherein the in-feed chamber is loaded with the meat from the top, while the meat is ejected through the bottom of the new pressing chamber into the portioning plate.

* * * * *